A. HEIMANN.
INTERNAL COMBUSTION ENGINE.
APPLICATION FILED APR. 6, 1916.

1,265,654.

Patented May 7, 1918.
7 SHEETS—SHEET 1.

INVENTOR
Albert Heimann
BY
HIS ATTORNEYS

UNITED STATES PATENT OFFICE.

ALBERT HEIMANN, OF NEW YORK, N. Y.

INTERNAL-COMBUSTION ENGINE.

1,265,654.  Specification of Letters Patent.  Patented May 7, 1918.

Application filed April 6, 1916. Serial No. 89,293.

*To all whom it may concern:*

Be it known that I, ALBERT HEIMANN, a citizen of the United States of America, residing at the borough of Manhattan, in the city, county, and State of New York, have invented an Improvement in Internal-Combustion Engines, of which the following is a specification.

My invention relates to internal combustion engines, and particularly to that type of such engines in which liquid fuel is used to operate the same, and furthermore with which a pump, pumps, or other similar means are employed to inject the fuel in predetermined quantities into the cylinders of the engine at predetermined times during the compression strokes of the pistons.

As is generally recognized, liquid fuels are of many different grades, and in order to obtain complete combustion and consequent economy in the operation of liquid fuel engines, it is necessary to inject some grades of fuel at one time and other grades at another time, certain oils requiring earlier and certain other oils requiring later injection during the compression stroke.

Now the object of my invention is the provision of a liquid fuel engine, with associated parts so constructed that the time of injecting the fuel may be adjusted and so regulated and controlled during the running of the engine, depending of course upon the grades of fuel being employed. This result is accomplished by the apparatus constructed in accordance with my invention, and in which, as will hereinafter appear, I dispense entirely with the use of auxiliary or counter-shafts and the necessary accompanying gear or chain transmission, in operating the pump, or pumps, employed to force the oil into the cylinders, by which construction, as will be appreciated, the power utilized in operating the pumps to inject the fuel is materially reduced. Furthermore, the construction of the injection time controlling devices is such that the same may be so operated as to obtain the necessary pre-ignition to reverse the engine.

In carrying out my invention, the parts are also so constructed and associated as to act in conjunction with a suitable governor apparatus, which, depending upon the speed of the engine, controls the quantity of fuel forced into the cylinders at each injection. Still furthermore, in order to prevent over heating of the cylinders and the igniters, I provide for the injection of a predetermined quantity of water with each injection of the oil or other liquid fuel, so that by a proper adjustment of the water supply, the governor will so control the injection of the oil and water as to maintain the cylinders and igniters at a substantially constant temperature, even under varying or excessive loads.

It is also a part of my present invention to provide suitable means for controlling the stroke of the pump pistons independently of the governor and the injection time controlling devices, so that both may be employed in conjunction with one another in reversing or in stopping the engine.

The improvements comprising this invention will be hereinafter more particularly described in conjunction with the accompanying drawing, in which

Fig. 1ª is a sectional longitudinal cross section of the upper end of one of the engine cylinders illustrating the connection for the oil injection pipe.

Figure 1:
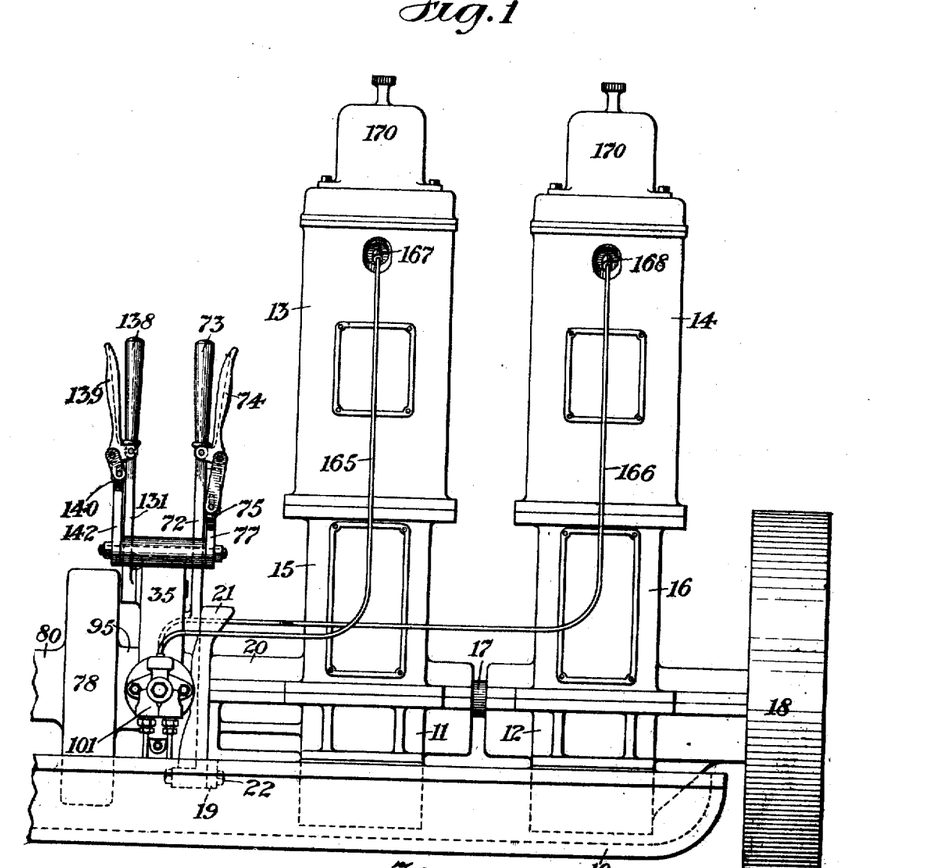
Figure 1 is an elevation illustrating a two-cylinder engine with which the apparatus comprising this invention is employed.
Figure 1A:
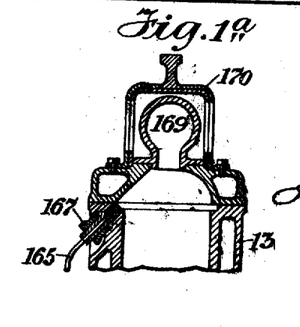

By reference to the drawing, it will be seen that in Fig. 1, I have illustrated more or less diagrammatically a two-cylinder engine in which my present invention is embodied, although, as will be understood, this invention may be employed in engines of any number of cylinders.

In the drawing 10 indicates a base plate which may be supported upon any suitable foundation. Connected to the base plate are the cylinder bases 11 and 12, supporting the cylinders 13 and 14 respectively through the intermediate rod and crank cases 15 and 16.

The engine shaft is indicated at 17, and as usual may be provided with a fly wheel 18.

The cylinder base 11 and the crank and rod cases 15 are suitably fitted with brackets or side extensions 19 and 20, respectively, and to the extension 19 a frame member 21 is secured by means of bolts 22, or otherwise, the upper portion of this frame member abutting against the bracket or extension 20 on the rod and crank case 15.

Figures 3, 5:
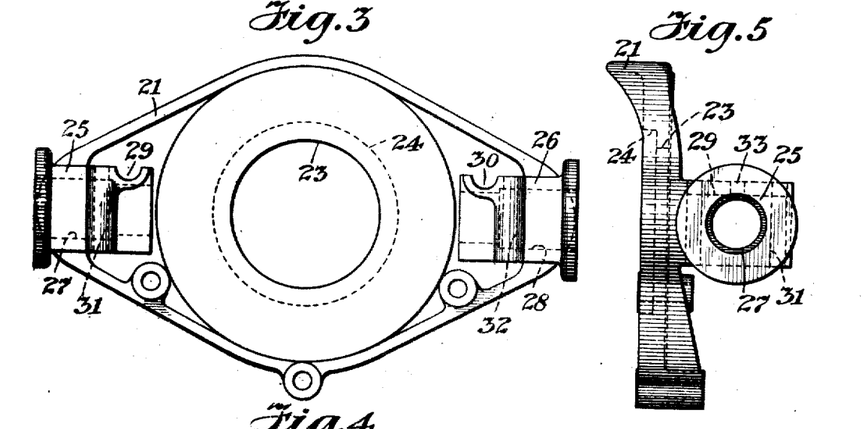
Fig. 3 is an elevation of one of the frame members.
Fig. 5 is an end elevation of the same.
Figure 4:
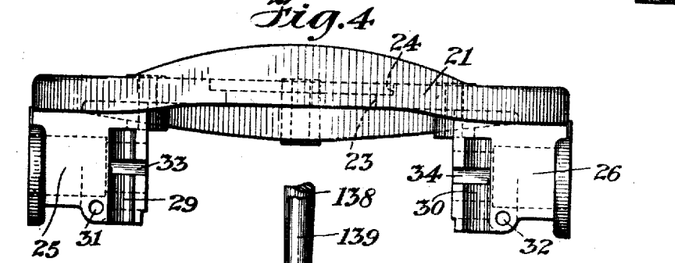
Fig. 4 is a plan view of the same.

By reference to Figs. 3, 4, and 5, it will be seen that the frame member 21 is provided centrally with an opening 23, and in the face adjacent the brackets 19 and 20 with a recess indicated at 24.

Suitably connected to this frame member 21 there are also provided brackets 25 and 26. These brackets are similarly constructed. In the bracket 25 there is a pump plunger bearing 27, and in the bracket 26 a similar bearing 28. Also in the bracket 25 there is a shaft bearing 29, and in the bracket 26 a similar shaft bearing 30. The bracket 25 is also provided with bolt holes 31 and the bracket 26 with similar bolt holes 32. In the inner portion of the bracket 25 the same is centrally slotted, as indicated at 33, and similarly on the inner portion of the bracket 26 the same is slotted, as indicated at 34.

Figure 6:
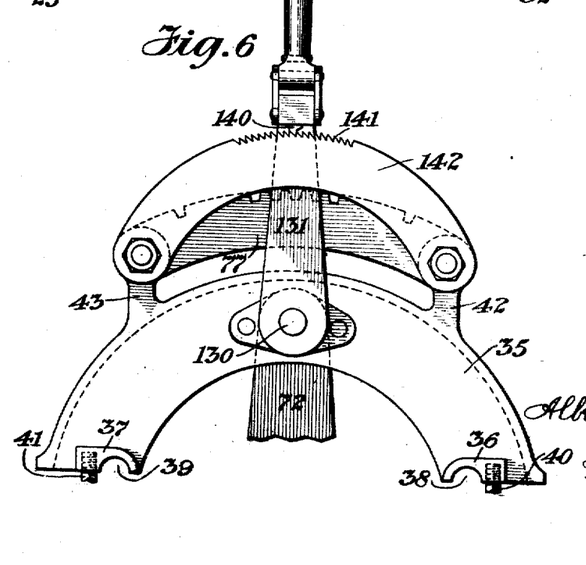
Fig. 6 is a front elevation of an auxiliary frame employed in conjunction with the frame shown in Figs. 3, 4 and 5.

In Fig. 6, as illustrated, the auxiliary frame is employed in connection with the frame member 21, the same being designated by 35. This auxiliary frame member 35 is provided with brackets 36 and 37 adapted to rest upon and be secured to the brackets 26 and 25, respectively, on the frame member 21. The bracket 36 is provided with a shaft bearing 38, which, with the shaft bearing 30 completes the bearing for a shaft to be hereinafter described. Similarly the bracket 37 is provided with a shaft bearing 39, which, with the shaft bearing 29 forms a bearing for a shaft to be hereinafter described.

The auxiliary frame 35 is secured in position to the frame member 21 by the bolts 40 and 41, which pass through the bolt holes 31 and 32, respectively, in the frame member 21 and into the brackets 37 and 36 on the auxiliary frame 35.

On the upper portion of the auxiliary frame member 35 there are lugs 42 and 43, the purpose of which will hereinafter appear.

Figures 7, 8, 9, 10:
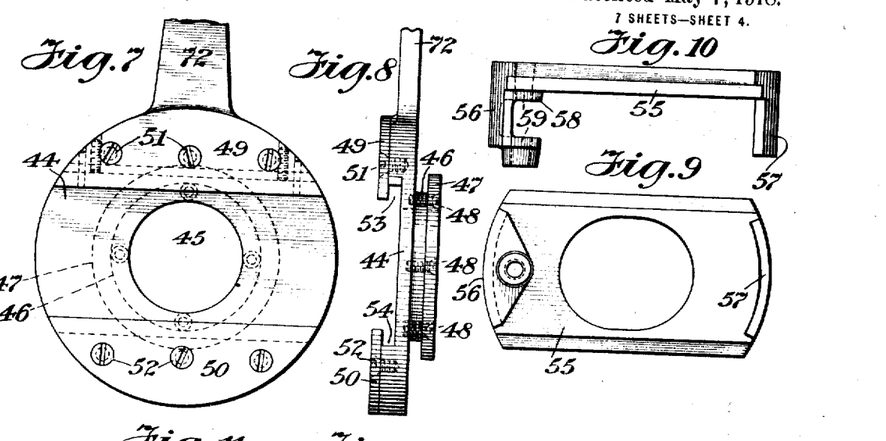
Fig. 7 is a front elevation of the disk member employed to determine the position of the reciprocating plunger.
Fig. 8 is a side or edge elevation of the same.
Fig. 9 is a front elevation of a reciprocating member employed to actuate the pump plungers.
Fig. 10 is a plan view of the same.

In Figs. 7 and 8, I have illustrated a disk 44 having a central opening 45 therein and on one face provided with a flange 46 with an opening of the same diameter as the opening 45. The flange 46, when the parts are assembled, passes through the opening 23 in the frame member 21, and this member is revolubly secured in position in the frame member 21 by a tie plate 47 which is secured to the flange 46 by means of the screws 48, or otherwise.

Secured in the face of the disk 44, there are guide plates 49 and 50, the former being fixed in position by bolts 51 and the latter by bolts 52, or otherwise. As clearly shown in Fig. 8, these plates, together with the body portion of the disk, provide guideways 53 and 54.

In Figs. 9 and 10, I have illustrated a reciprocating plunger or contact plate, indicated at 55. Centrally, this member is also provided with an opening through which the engine shaft passes, and at its ends is fitted with brackets 56 and 57 respectively, the outer faces of these brackets forming contact surfaces for actuating the pump plungers, as will be hereinafter more particularly described.

The bracket 56, at one end of the reciprocating plunger plate 55, is provided with a bearing 58 in which there are bolt holes 59.

Figure 11:
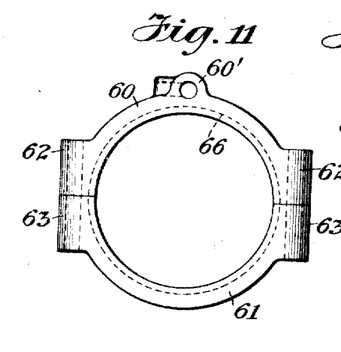
Fig. 11 is a front elevation of an eccentric strap.
Figure 12:
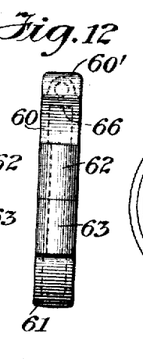
Fig. 12 is a side elevation of the same.

In Fig. 11, there is illustrated an eccentric strap, the parts of which are indicated at 60 and 61. These parts, on opposite sides, are provided with lugs 62 and 63, respectively, provided with bores for the reception of bolts 64 and 65, and by which the parts of the strap may be secured together.

Interiorly, the parts of this eccentric strap are recessed, as indicated at 66, and the strap member 60 is fitted with a lug 60', adapted to be received in the bearing 58 of the bracket 56, of the reciprocating plunger member 55, and to be secured in position therein by a suitable bolt 66'.

Figures 13, 14:
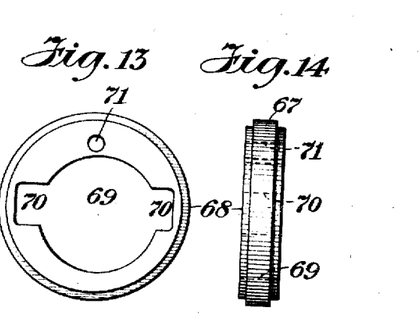
Fig. 13 is a side elevation of an auxiliary eccentric.
Fig. 14 is an end elevation of the same.

A rim 67, of an eccentric eccentric-strap 68, as shown in Figs. 13 and 14, fits within the recess 66 in the straps 60 and 61. In the eccentric eccentric-strap 68 there is an offset opening 69, and diametrically opposite recessed portions 70, as well as the transverse opening 71, the purpose and functions of all of which will be hereinafter more particularly described.

Secured to and extending from the disk 44, is a lever 72, provided at its outer, upper and free end with a handle 73, connected to which is a pivotally mounted trip 74 operating a tongue 75 adapted to engage the teeth 76 in a rack bar 77 extending between and suitably secured to the lugs 42, extending upwardly from the auxiliary frame 35, as hereinbefore described.

Figure 21:
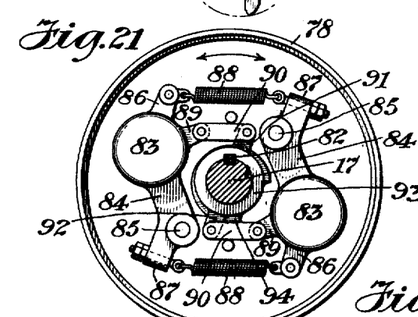
Fig. 21 is a section taken through the governor.
Figure 22:
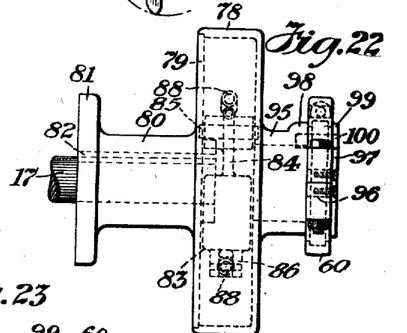
Fig. 22 is a side elevation of the governor case and the parts associated therewith.
Figure 23:
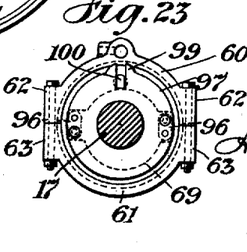
Fig. 23 is a partial front elevation of the same.

I also employ a governor mechanism which is illustrated in Figs. 21, 22, and 23. The governor case is indicated at 79. One face of the same comprises a plate 79 adapted to be set into the rim of the governor case, and is suitably secured in position therein. The plate 79 is carried by a sleeve 80, being on one end of the sleeve, while at the opposite end of this sleeve there is a flange 81, by which the sleeve and consequently the governor may be connected to a suitable clutch or other part of the engine mechanism.

As particularly shown in Figs. 21 and 22, the engine shaft 17 is secured to the sleeve 80 by means of a key 82. The governor mechanism comprises weights 83 secured at the ends of arms 84, on which there are suitable trunnions 85 journaled in bearings provided therefor in the opposite walls of the governor casing, one of which, as will be understood, is the plate 79.

Figure 15:
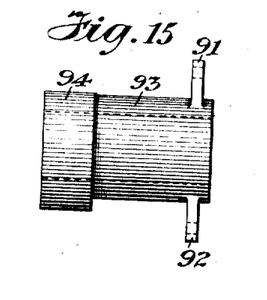
Fig. 15 is a side elevation of an eccentric member.
Figure 16:
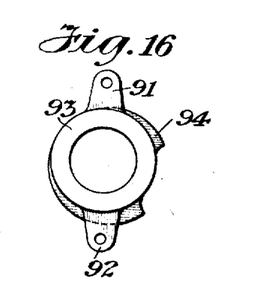
Fig. 16 is an end elevation of the same.

Projecting from each of the governor weights 83, in similar positions, there is a lug 86, and also connected to each arm 84 and reaching beyond its pivotal point there is an extension 87. The lug 86 of each governor weight is connected to the extension arm 87 of the other governor weight by a spring 88, or any suitable means. Each governor weight 83 is also provided with a lug 89, these lugs being placed in similar positions, and the lugs 89 are pivotally connected to one end of links 90. The opposite end of one link 90 is pivotally connected to an extension arm 91, and the other link 90 is similarly connected to an extension arm 92 of an eccentric member 93, the arms 91 and 92 of this eccentric member extending in diametrically opposite positions therefrom, as shown in Figs. 15 and 16, and lying centrally within the governor case, as shown in Fig. 22.

The eccentric member 93 is mounted to turn on the engine shaft 17 and at the end thereof opposite that to which the arms 91 and 92 are connected there is an eccentric 94. This eccentric is adapted to fit within the eccentric opening 69 in the eccentric eccentric-strap 68, as is also indicated in Fig. 22.

Extending from the governor casing 78 is a sleeve 95, through which the eccentric member 93 passes. In diametrically opposite positions on the end of the sleeve 95 there are lugs 96. These lugs receive the recessed portions 70 of the eccentric eccentric-strap 68. The lugs 96 have secured thereto a plate 97. These parts may be connected by suitable screws or otherwise, and on the periphery of the sleeve 95, adjacent the end thereof, is a boss 98, and on the plate 97 is a boss 99, the boss 99 being so placed as to correspond in position with the boss 98. These bosses are slotted to receive the flattened ends of a pin 100, which passes through the hole 71, or otherwise apertured portion, in the eccentric eccentric-strap 68, in order to connect the same to the governor case so that this member is caused to revolve with the governor.

In engines of the type to which this invention relates, it is customary to employ a separate supply pump for each cylinder of the engine, and the pumps, as herein illustrated, are shown at 101 and 102. These pumps are similarly constructed and consequently but one pump will be described and that not in all its details, inasmuch as the present invention does not relate to the pump construction *per se*.

Each pump comprises a body 103, in which there is a chamber 104 into which oil is drawn through the suction connection 105, and water is drawn through the water suction 106. In each of these suction connections, there are suitable ball valves 107, as shown in Fig. 18, each being adapted to bear against a suitable seat to prevent the return of oil or water, or both, from the pump chamber to the respective suction pipes.

108 indicates the discharge pipe, being a common dicharge for the combined oil and water as delivered by the pump.

In the discharge end of the pump there are also ball valves 109 adapted to bear against suitable seats to prevent the return of the oil and water to the pump chamber after the same have been discharged from the pump.

Figures 2, 17, 18:
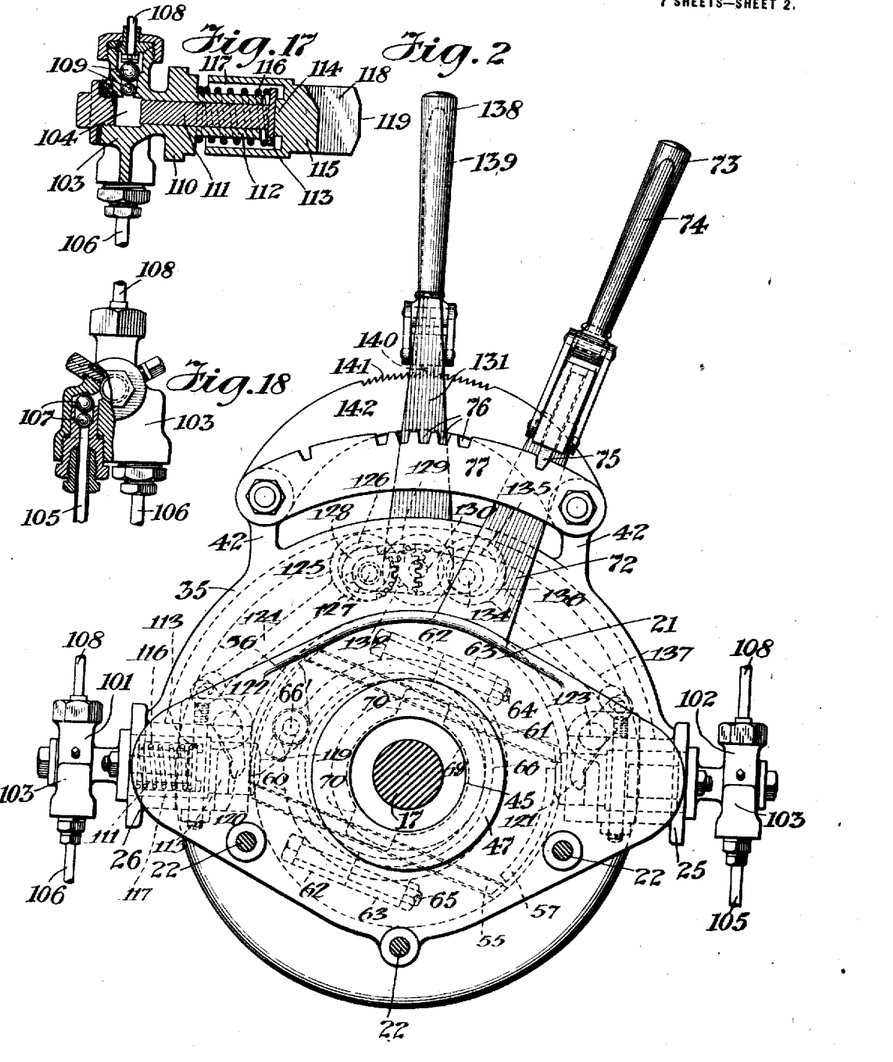
Fig. 2 is an elevation and partial section illustrating the parts to which more particularly the present invention relates.
Fig. 17 is a central sectional elevation of one of the pumps.
Fig. 18 is an end elevation and partial section of this type of pump.

The pump body is provided with a flange 110, by which it is suitably connected to the frame member 21, a pump being provided as indicated in Fig. 2 in each end of this frame member.

Each pump also includes a plunger 111 passing through the flange 110 into the pump chamber 104, and operating in a sleeve 112 extending from the pump body and flange.

At its outer extremity, the plunger 111 is flanged, as indicated at 113, and this end of the plunger is adapted to contact with a boss 114, provided for this purpose on an auxiliary plunger 115, and to be maintained in this position by a spring 116, which surrounds the sleeve 112 and extends between the inner face of the flange 110 and the adjacent face of the flange 113.

The auxiliary plunger 115 has a socket portion 117 fitting over the spring 116 and terminating sufficiently far from the flange 110 to permit the auxiliary plunger to be moved, so as to move the main plunger to operate the pump. The socket portion 117 of the auxiliary plunger slides in a plunger bearing 27 on the frame 21.

As indicated in Fig. 17, the auxiliary plunger 115 at its inner end is recessed at 118, and the inner end 119 of the auxiliary plunger is the contact surface against which one end of the reciprocating contact plunger 55 strikes in the operation of the apparatus, as hereinafter described, to actuate the plunger and so operate the pump.

As hereinbefore intimated, my invention also comprises suitable means for limiting the position of the plunger and auxiliary plunger of each pump, and consequently determining the length of its stroke. These parts are shown in Fig. 2, and illustrated more particularly in Figs. 19 and 20. They comprise stop levers 120 and 121. These are adapted to pass through the recesses 33 and 34 in brackets 25 and 26 of the frame member 21, and into the recessed inner ends of the auxiliary plungers of the pump, these parts being clearly shown in this position in Fig. 2.

Figure 19:
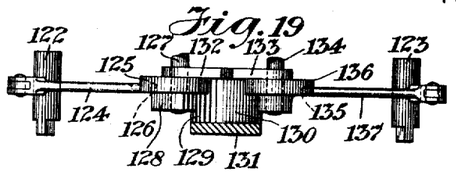
Fig. 19 is a plan and partial cross section of the parts employed to determine the length of the stroke of the pump pistons.
Figure 20:
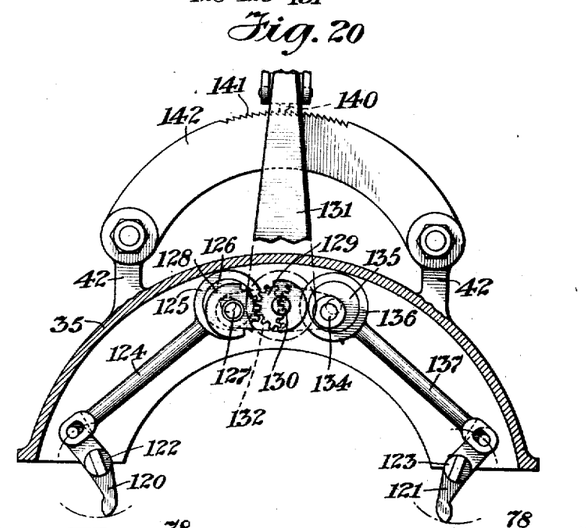
Fig. 20 is a front elevation of the same showing a part of the auxiliary frame in cross section.

The stop lever 120 is connected to a shaft 122, and the stop lever 121 to a shaft 123. The shaft 122 is journaled in bearings 29 and 39, in the brackets 25 and 37 and similarly the shaft 123 is journaled in the bearings 30 and 38, in the brackets 26 and 36.

At the end of the stop lever 120 opposite that engaged in the recess 118 of the auxiliary plunger of the pump, the same is connected to a rod 124. The opposite end of this rod is provided with an eccentric strap 125, in which there is an eccentric 126 mounted on a shaft 127 journaled in the auxiliary frame 35. This shaft 127 also carries a gear 128, which meshes with the segmental gear or gear teeth 129 provided in the shaft 130, which is also journaled in the auxiliary frame 35, and connected to the shaft 130 is a lever 131.

Also on the shaft 127 and on the opposite side of the eccentric 126, the same is provided with a segmental gear 132. This segmental gear 132 meshes with a similar segmental gear 133 mounted on a shaft 134 also journaled in the auxiliary frame 35.

Also on the shaft 134 there is an eccentric 135 similar to the eccentric 126 but oppositely placed. An eccentric strap 136 is fitted around the eccentric 135, and this eccentric strap 136 is at one end of a rod 137, the opposite end of which is pivotally connected to the end of the stop lever 121 opposite that engaged in the recess 118 in the inner end of the auxiliary plunger of the pump on the opposite side of the frame member 21.

At its free end the lever 131 is provided with a handle 138 and a spring actuated trip member 139 and tongue 140, the latter being adapted to engage the teeth 141 in the edge of the segmental bar 142, which also extends between and is suitably connected to the lugs 42, extending upwardly from the upper portion of the auxiliary frame 35.

It will be apparent that by the operation of the lever 131, the shaft 130 and segmental gears, straps, and eccentrics actuated thereby may be operated to correspondingly move the stop levers 120 and 121 through the rods 134 and 137 to determine the positions of the auxiliary plungers of the pumps and consequently to determine the extent of movement of these plungers, thereby regulating the quantity of oil or oil and water discharged by each pump every time the plunger is actuated.

The construction and location of the pumps, as hereinbefore described are particularly adapted for comparatively small engines, that is engines of comparatively small horse power.

Figures 24, 25:
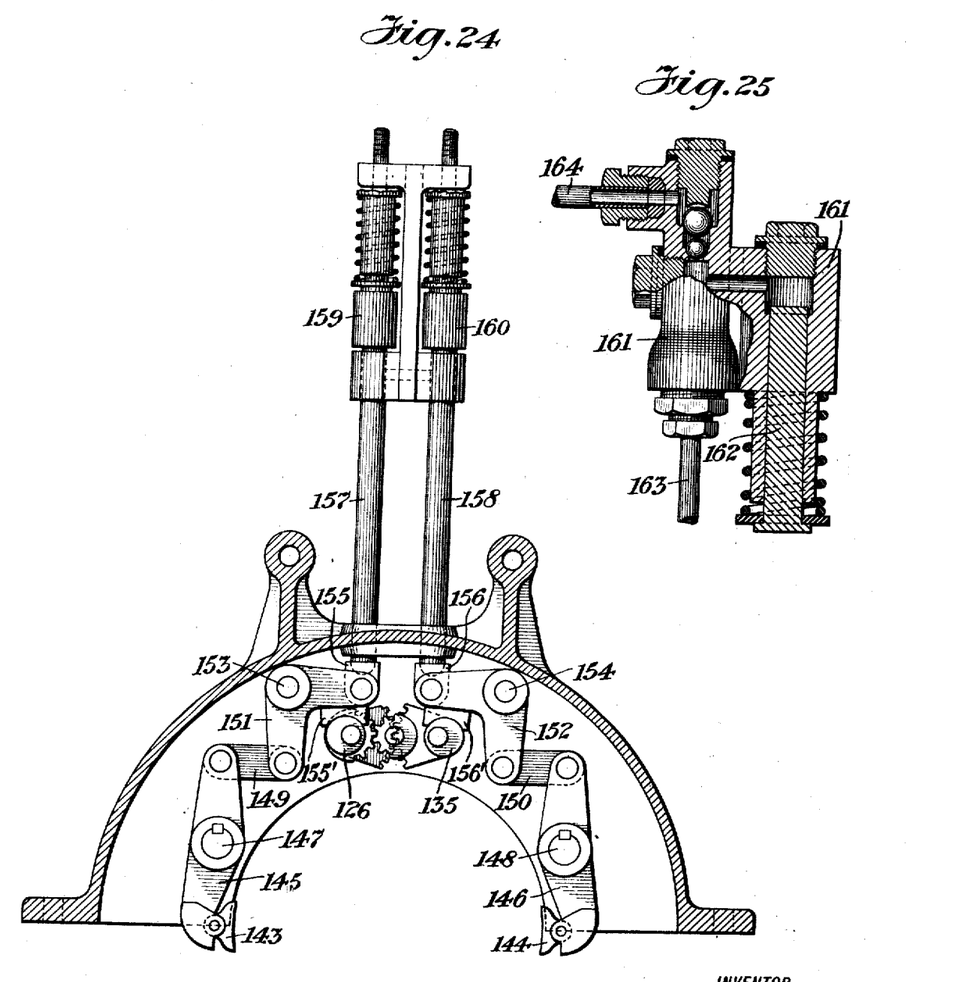
Fig. 24 is an elevation and partial cross section illustrating a modified apparatus for operating the pump plungers when the pumps are seated adjacent the cylinders.
Fig. 25 is a central longitudinal cross section and partial elevation of the type of pump employed when the pumps are placed in this position.
Figure 26:
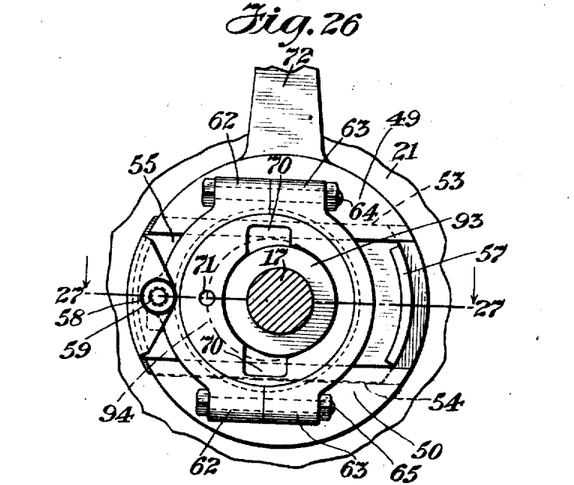
Fig. 26 is a sectional elevation showing in their operative positions the various parts illustrated in detail in Figs. 7 to 16 inclusive.
Figure 27:
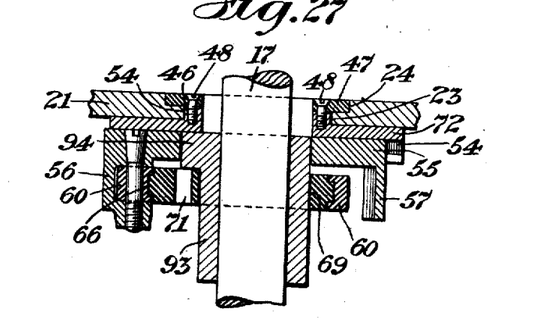
Fig. 27 is a cross section on line 27—27 Fig. 26.

In larger engines, it i preferable to locate each pump adjacent the point on each cylinder at which the injection of oil or oil and water is made, and therefore instead of actuating the pump plungers directly, as is done by the mechanism hereinbefore described, I may employ the devices shown in Figs. 24 and 25 for operating the pumps when placed on the cylinders adjacent the points at which the injection is admitted. These comprise contacting members 143 and 144 adapted to be engaged by the contact surfaces of the reciprocating plunger member 55, and each pivotally connected to one end of the levers shown at 145 and 146.

The lever 145 is connected to a shaft 147 and is suitably journaled therein, and the lever 146 is similarly connected to a shaft 148. The opposite end of the lever 145 is pivotally connected to one end of a link 149, the opposite end of which is connected to the end of one arm of a bell crank lever 151. This bell crank lever is mounted on a shaft 153 and the end of its other arm is pivotally connected to a socket 155.

Similarly, to operate the other pump, the opposite end of the lever 146 is connected to one end of a link 150, the opposite end of which is pivotally connected to the end of one arm of a bell crank lever 152 mounted on a shaft 154, the end of the other arm of which being pivotally connected to a socket 156.

The end of the pump plunger rod 157 fits within the socket 155 and the corresponding end of the pump plunger rod 158 fits within the socket 156, the rod 157 being adapted to actuate one or more pumps, and the rod 158 to actuate one or more other pumps, these being connected respectively to the auxiliary pump plungers 159 and 160.

The eccentrics 126, 135, Fig. 24, are provided with stops 155' and 156' acting to determine the length of the strokes of rods 157 and 158, in the same manner that the stop levers 120 and 120 determine the stroke of the auxiliary plungers 115.

The form of pump preferably employed is located adjacent the injection point, as shown in Fig. 25. This comprises a body 161 fitted with a plunger 162, suction connections 163, and a discharge connection 164, the arrangement of the ports and suction and discharge connections being somewhat different to those shown and described in connection with Figs. 17 and 18, but inasmuch as the pump construction forms no part of my present invention, no further description of the same is deemed necessary.

Referring again to Figs. 1 and 2, the discharge of the pump 101 is connected by a pipe 165 to the intake connection 167 of the cylinder 13, and the discharge from the pump 102 is connected by the pipe 166 to the intake connection 168 of the cylinder 14, each cylinder being provided with an ignition chamber 169 at its upper end and a cap 170, the injection connection being so placed as to direct the fuel into the ignition chamber and so constructed as to prevent its return through the supply pipe. These members, however, form no part of the present invention.

In the operation of the hereinbefore described apparatus, the governor is turned by the engine shaft when running through the key 82, and while mounted to turn on the engine shaft the eccentric member 93 is turned with the shaft through its connection with the governor, as hereinbefore described, and as will be understood the relative position of the eccentric member 93 on the shaft is dependent upon the speed at which the same turns, varying of course with the positions of the governor weights 83 which, due to centrifugal action, are extended further against the action of the springs 88 from the axis on the shaft as the speed of the engine increases.

The eccentric eccentric strap 68 is also turned with the governor by the pin 100, and it is connected with the plate 97 and the sleeve 95 extending from the governor, also as hereinbefore described. This eccentric eccentric-strap is turned within the eccentric strap 60—61, by which, as will be understood, a reciprocating motion is imparted to the plunger plate 55, the striking or contact surfaces of which are made in the arc of a circle, whose center is preferably the center of the plate which coincides with the center of the engine shaft.

The cranks on the engine shaft are set at 180° apart, and consequently in each revolution thereof, when moved in one direction the reciprocating plunger plate strikes the auxiliary plunger of one pump and actuates its main plunger to force the oil and water injection into one cylinder and when moved in the other direction the opposite contact surface of the reciprocating plunger strikes the auxiliary plunger of the other pump to operate its main plunger and force the injection of oil and water into the other engine cylinder.

Obviously, in the operation of the engine, the centers of the eccentric member 93, in the eccentric eccentric strap 68, vary moving apart or coming together, depending upon the speed of the engine resulting, as will be understood, in the resultant variation in the length of the travel or stroke of the reciprocating plunger plate 55, which, as will be understood, correspondingly varies the stroke of the pump pistons with a corresponding variation in the amount or quantity of the fuel and water injected into the cylinder.

It will also be apparent that by manually shifting the position of the lever 72 and the rocker disk 44, the position of the reciprocating plunger plate 55 is correspondingly adjusted, and the time during the compression stroke of the pistons at which the fuel is injected into the cylinders is dependent upon the position of the lever 72 and the rocker disk 44, which determine the angular position of the reciprocating plunger plate.

It will further be understood that by shifting the lever 72 and the rocker disk 44 to the extreme position in one direction, as shown in Fig. 2, for the purpose of clearness in illustration, the injection of the fuel supply may be made at such a time as to obtain a pre-ignition resulting in the reversal of the engine, which will continue to run in this direction when the lever 72 is shifted back to its normal operative position when the engine will continue to run in the reversed direction. Obviously, also, to again reverse the engine, the lever 72 and the rocker disk 44 may be shifted to the other extreme position to obtain another pre-ignition, resulting again in the reversal of the engine.

As hereinbefore described, the lever 131 may be adjusted to position to determine the position of the stop levers 120 and 121, which in turn control the positions and return strokes of the plungers of the pumps, and by the lever 131 and the parts intermediate of the same and the stop levers 120 and 121, as hereinbefore described, the pump plunger may be so placed as to bring the contact surface of the auxiliary pump plungers entirely out of the path of the contact surfaces of the reciprocating plunger plate 55. In other words, the stop levers 120 and 121 may be so adjusted by the lever 131 and the intermediate parts to vary the stroke of the pump plungers from zero to a maximum.

It will also be apparent that the levers 74 and 131 may be actuated in conjunction with one another to operate the parts hereinbefore described in the stopping, reversal and other controlling of the engine, and also that the water supply may be so regulated and controlled that through the action of the governor sufficient water may be injected with the oil or other liquid fuel charge to maintain a constant temperature in the engine cylinders.

I claim as my invention.

1. In an internal combustion engine, the combination with a cylinder, a pump and a shaft, of a reciprocating device, means for actuating the same to operate the pump, and means independent of the aforesaid means for adjusting the position of the reciprocating device to determine the time of operating the pump to inject the fuel into the engine cylinder.

2. In an internal combustion engine, the combination with a cylinder, a pump and a shaft, of a reciprocating device, means for actuating the same to operate the pump, means for adjusting the position of the reciprocating device to determine the time of operating the pump to inject the fuel into the engine cylinder, and means dependent upon the speed of the shaft for varying the stroke of said reciprocating device.

3. In an internal combustion engine, the combination with a cylinder, a pump, a plunger therefor and a shaft, of a reciprocating device, means for actuating the same to operate the pump plunger, means for adjusting the position of the reciprocating device to determine the time at which the pump plunger is actuated to inject the fuel into the engine cylinder, and means for varying the stroke of the pump plunger.

4. In an internal combustion engine, the combination with a cylinder, a pump, a plunger therefor and a shaft, of a reciprocating device, means for actuating the same to operate the pump plunger, means for adjusting the position of the reciprocating device to determine the time at which the pump plunger is actuated to inject the fuel into the engine cylinder, means for varying the stroke of the pump plunger, and means dependent upon the speed of the shaft for varying the stroke of said reciprocating device.

5. In an internal combustion engine, the combination with a cylinder, a pump and a shaft, of a rocker member, means in which the same is mounted, a reciprocating member adapted to slide in the said rocker member to operate said pump, and means for adjusting the rocker member to position to determine the time at which the reciprocating member operates the pump to inject a charge of fuel into the engine cylinder.

6. In an internal combustion engine, the combination with a cylinder, a pump and a shaft, of a rocker member, devices in which the same is mounted, a reciprocating member mounted to slide in the said rocker member, means for actuating the reciprocating member from the said shaft to operate the said pump, means for adjusting the position of the rocker member to determine the time at which the reciprocating member operates the pump to inject the fuel into the engine cylinder, and means dependent upon the speed of the shaft for varying the stroke of said reciprocating member.

7. In an internal combustion engine, the combination with a cylinder, a pump, a pump plunger therefor and a shaft, of a rocker member, devices in which the same is mounted, a reciprocating member adapted to slide in the said rocker member, means for actuating the reciprocating member from the said shaft, means for adjusting the rocker member to position to determine the time at which the reciprocating member operates the pump plunger to inject a charge of fuel into the engine cylinder, means dependent upon the speed of the shaft for varying the stroke of a reciprocating member, and means for adjusting the stroke of the pump plunger.

8. In an internal combustion engine, the combination with a cylinder, a pump and a shaft, of a frame member, a rocker disk mounted therein, a reciprocating member mounted to slide in the rocker disk, means for actuating the reciprocating member from said shaft, and means for adjusting the position of the rocker disk and maintaining the same in its adjusted position to determine the time at which the reciprocating member operates the pump to inject a charge of fuel into the engine cylinder.

9. In an internal combustion engine, the combination with a cylinder, a pump and a shaft, of a frame member, a rocker disk mounted therein, a reciprocating member mounted to slide in the rocker disk, means for actuating the reciprocating member from said shaft and which dependent upon the speed of the shaft determines the stroke of the reciprocating member, and means for adjusting the position of the rocker disk and maintaining the same in its adjusted position to determine the time at which the reciprocating member operates the pump to inject a charge of fuel into the engine cylinder.

10. In an internal combustion engine, the combination with a cylinder, a pump, a plunger therefor and a shaft, of a frame member, a rocker disk mounted therein, a reciprocating member mounted to slide in the rocker disk, means for actuating the reciprocating member from said shaft and which dependent upon the speed of the shaft determines the stroke of the reciprocating member, means for adjusting the position of the rocker disk and maintaining the same in its adjusted position to determine the time at which the reciprocating member operates the pump to inject a charge of fuel into the engine cylinder, and means for adjusting the stroke of the pump plunger.

11. In an internal combustion engine, the combination with a cylinder, a pump and a shaft, of a frame secured to the frame of the engine, a rocker disk mounted therein, a reciprocating member adapted to slide in said rocker disk, an eccentric trap connected in said reciprocating member, and eccentric devices on said shaft for actuating said eccentric strap to operate the said reciprocating member which in turn operates the pump.

12. In an internal combustion engine, the combination with a cylinder, a pump and a shaft, of a frame secured to the engine frame, a rocker disk mounted in the said frame, a reciprocating member adapted to slide in the said rocker disk, an eccentric strap to which the said reciprocating member is connected, eccentric devices on the said shaft for actuating the eccentric strap to operate the reciprocating member, which in turn operates the pump, and means for adjusting the position of the rocker disk and reciprocating member and maintaining the same in said adjusted position to determine the time at which the reciprocating member operates the pump to inject a charge of fuel into the engine cylinder.

13. In an internal combustion engine, the combination with a cylinder, a pump and a shaft, of a frame secured to the engine frame, a rocker disk mounted therein, a reciprocating member adapted to slide in the rocker disk, means for adjusting the position of the rocker disk and reciprocating member and maintaining the same in their adjusted position, an eccentric strap to which said reciprocating member is connected, a governor, and eccentric devices controlled by the governor to actuate said eccentric strap to move and determine the stroke of the said reciprocating member which is adapted to operate said pump.

14. In an internal combustion engine, the combination with a cylinder, a pump, a plunger therefor and a shaft, of a frame secured to the frame of the engine, a rocker disk mounted therein, a reciprocating member adapted to slide in said rocker disk, an eccentric strap connected in said reciprocating member, eccentric devices on said shaft for actuating said eccentric strap to operate the said reciprocating member which in turn operates the pump, and adjustable means for controlling the stroke of the pump plunger.

15. In an internal combustion engine, the combination with a cylinder, a pump, a plunger therefor and a shaft, of a frame secured to the engine frame, a rocker disk mounted in the said frame, a reciprocating member adapted to slide in the said rocker disk, an eccentric strap to which the said reciprocating member is connected, eccentric devices on the said shaft for actuating the eccentric strap to operate the reciprocating member, which in turn operates the pump, means for adjusting the position of the rocker disk and reciprocating member and maintaining the same in said adjusted position to determine the time at which the reciprocating member operates the pump to inject a charge of fuel into the engine cylinder, and adjustable means for controlling the stroke of the pump plunger.

16. In an internal combustion engine, the combination with a cylinder, a pump, a plunger therefor and a shaft, of a frame secured to the engine frame, a rocker disk mounted therein, a reciprocating member adapted to slide in the rocker disk, means for adjusting the position of the rocker disk and reciprocating member and maintaining the same in their adjusted position, an eccentric strap to which said reciprocating member is connected, a governor, eccentric devices controlled by the governor to actuate said eccentric strap to move and determine the stroke of the said reciprocating member which is adapted to operate said pump, and adjustable means for controlling the stroke of the pump plunger.

17. In an internal combustion engine, the combination with a cylinder, a pump and a shaft, of a rocker disk, a device in which the same is movable, a reciprocating plunger adapted to slide in said rocker disk, an eccentric strap associated with said reciprocating plunger, and an eccentric on said shaft for actuating the eccentric strap to move the said reciprocating plunger to actuate the pump.

18. In an internal combustion engine, the combination with a cylinder, a pump and a shaft, of a rocker disk, a device in which the same is movable, a reciprocating plunger mounted to slide in the said rocker disk, an eccentric strap associated with the reciprocating plunger, an eccentric on the said shaft, and an eccentric eccentric-strap between the said eccentric on the shaft and said eccentric strap for actuating the said reciprocating plunger to operate the pump.

19. In an internal combustion engine, the combination with a cylinder, a pump and a shaft, of a rocker disk, a device in which the same is movable, a reciprocating plunger mounted to slide in the said rocker disk, an eccentric strap associated with the reciprocating plunger, an eccentric on the said shaft, an eccentric eccentric strap between the said eccentric on the shaft and said eccentric strap, a governor, and means for connecting the said governor and said eccentric.

20. In an internal combustion engine, the combination with a cylinder, a pump, a plunger therefor and a shaft, of a rocker disk, a device in which the same is movable, a reciprocating plunger mounted to slide in the said rocker disk, an eccentric strap associated with the reciprocating plunger, an eccentric on the said shaft, an eccentric eccentric strap between the said eccentric on the shaft and said eccentric strap, a governor, means for connecting the said governor and said eccentric, and means for varying the stroke of said pump plunger.

21. In an internal combustion engine, the combination with cylinders and the engine shaft, of a frame member extending laterally of the engine, a pump mounted in each end thereof, a pipe connection from the discharge of each pump to an engine cylinder, a reciprocating device for operating said pumps, means for actuating the said reciprocating device from the said shaft, and means for adjusting the reciprocating device to position to determine the time at which the pumps are operated to inject the fuel into the engine cylinders.

22. In an internal combustion engine, the combination with cylinders, and the engine shaft, of a frame member extending laterally of the engine, a pump mounted in each end thereof, a plunger for each pump, a pipe connection from the discharge of each pump to an engine cylinder, a reciprocating device for operating said pumps, means for actuating the said reciprocating device from the said shaft, means for adjusting the reciprocating device to position to determine the time at which the pumps are operated to inject the fuel into the engine cylinders, and means for simultaneously adjusting the stroke of each pump plunger.

23. In an internal combustion engine, the combination with the cylinders and the engine shaft, of a frame connected to and extending laterally of the engine, a pump mounted in each end of the said frame, a pipe connection from the discharge of each pump to an engine cylinder, a rocker disk mounted to turn in the said frame, a reciprocating member mounted to slide in said rocker disk, means for actuating the said reciprocating member to operate the pumps, and means for adjusting the position of said rocker disk and reciprocating member to determine the time at which the pumps are operated to inject the fuel into the engine cylinders.

24. In an internal combustion engine, the combination with the cylinders and the engine shaft, of a frame connected to and extending laterally of the engine, a pump mounted in each end of the same frame, a pipe connection from the discharge of each pump to an engine cylinder, a rocker disk mounted to turn in the said frame, a reciprocating member mounted to slide in said rocker disk, means for actuating the said reciprocating member from said shaft, and means for adjusting the position of said rocker disk and reciprocating member to determine the time at which the pumps are operated to inject the fuel into the engine cylinders.

25. In an internal combustion engine, the combination with the cylinders and the engine shaft, of a frame connected to and extending laterally of the engine, a pump mounted in each end of the said frame, a pipe connection from the discharge of each pump to an engine cylinder, a rocker disk mounted to turn in the said frame, a reciprocating member mounted to slide in said rocker disk, means for actuating the reciprocating member from the said shaft so as to vary the length of its stroke dependent upon the speed of the shaft, and means for adjusting the position of said rocker disk and reciprocating member to determine the time at which the pumps are operated to inject the fuel into the engine cylinders.

26. In an internal combustion engine, the combination with cylinders, and the engine shaft, of a frame connected to and extending laterally of the engine, a pump mounted in each end of the said frame, a plunger for each pump, a pipe connection from the discharge of each pump to an engine cylinder, a rocker disk mounted to turn in said frame, a reciprocating member mounted to slide in said rocker disk, means for actuating the reciprocating member from the said shaft so as to vary the length of its stroke dependent upon the speed of the shaft, means for adjusting the position of said rocker disk and reciprocating member to determine the time at which the pumps are operated to inject the fuel into the engine cylinders, and means for simultaneously adjusting to the same extent the stroke of said pump plungers.

27. In an internal combustion engine, the combination with the cylinders and the engine shaft, of a frame connected to and extending laterally of the engine, a pump mounted in each end of the said frame, a pipe connection from the discharge of each pump to an engine cylinder, a rocker disk mounted to turn in the said frame, a reciprocating member mounted to slide in said rocker disk, means for actuating the said reciprocating member to operate the pumps, an eccentric strap connected to and operating within the said reciprocating member, an eccentric eccentric strap operating within the said eccentric strap, and an eccentric on said shaft for actuating the said reciprocating member through the said eccentric strap and eccentric eccentric-strap to operate the said pumps.

28. In an internal combustion engine, the combination with the cylinders and the engine shaft, of a frame connected to and extending laterally of the engine, a pump mounted in each end of the said frame, a pipe connection from the discharge of each pump to an engine cylinder, a rocker disk mounted to turn in the said frame, a reciprocating member mounted to slide in said rocker disk, means for actuating the said reciprocating member to operate the pumps, an eccentric strap connected to and operating within the said reciprocating member, an eccentric eccentric-strap operating within the said eccentric strap, an eccentric on said shaft for actuating the said reciprocating member through the said eccentric strap and eccentric eccentric-strap to operate the said pumps, a governor connected to said shaft, and means for connecting the said governor to said eccentric.

29. In an internal combustion engine, the combination with the cylinders and the engine shaft, of a frame connected to and extending laterally of the engine, a pump mounted in each end of the said frame, a plunger for each pump, a pipe connection from the discharge of each pump to an engine cylinder, a rocker disk mounted to turn in the said frame, a reciprocating member mounted to slide in said rocker disk, means for actuating the said reciprocating member to operate the pumps, an eccentric strap connected to and operating within the said reciprocating member, an eccentric eccentric-strap operating within the said eccentric strap, an eccentric on said shaft for actuating the said reciprocating member through the said eccentric strap and eccentric eccentric-strap to operate the said pumps, a governor connected to said shaft, means for connecting the said governor to said eccentric, and means for simultaneously adjusting to the same extent the stroke of said pump plungers.

30. In an internal combustion engine and in combination, cylinders, a shaft, an injection pump for each cylinder, a connection between each cylinder and its injection pump, a plunger for each pump, a reciprocating member for actuating the pump plungers alternately, a rocker disk in which the reciprocating member is mounted, means for adjusting the rocker disk to position and maintaining the same and the reciprocating member in their adjusted positions to determine the time at which the pump plungers are actuated by the reciprocating member and to reverse the engine by pre-ignition of a charge of liquid fuel, and means for operating the said reciprocating member from the said shaft.

31. In an internal combustion engine and in combination, cylinders, a shaft, an injection pump for each cylinder, a connection between each cylinder and its injection pump, a plunger for each pump, a reciprocating member for actuating the pump plungers alternately, a rocker disk in which the reciprocating member is mounted, means for adjusting the rocker disk to position and maintaining the same and the reciprocating member in their adjusted positions to determine the time at which the pump plungers are actuated by the reciprocating member and to reverse the engine by pre-igniting a charge of liquid fuel, an eccentric strap associated with and operating in said reciprocating member, an eccentric eccentric-strap operating within said eccentric strap, an eccentric on said shaft and operating within the said eccentric eccentric-strap, a governor secured on said shaft, and a connection between the said governor and eccentric.

Signed by me this 3rd day of April, 1916.

ALBERT HEIMANN.